(12) United States Patent
Lim et al.

(10) Patent No.: US 11,124,098 B2
(45) Date of Patent: Sep. 21, 2021

(54) CHANNEL COVER FOR VENTILATION SEAT AND METHOD OF MANUFACTURING SAME

(71) Applicant: HYUNDAI TRANSYS INCORPORATED, Seosan-si (KR)

(72) Inventors: Ho Sub Lim, Seoul (KR); You Jeong Jeong, Hwaseong-si (KR)

(73) Assignee: HYUNDAI TRANSYS INCORPORATED, Seosan-si (KR)

( * ) Notice: Subject to any disclaimer, the term of this patent is extended or adjusted under 35 U.S.C. 154(b) by 0 days.

(21) Appl. No.: 16/833,973

(22) Filed: Mar. 30, 2020

(65) Prior Publication Data

US 2020/0317097 A1 Oct. 8, 2020

(30) Foreign Application Priority Data

Apr. 2, 2019 (KR) .................. 10-2019-0038268

(51) Int. Cl.
*B60N 2/56* (2006.01)
*B32B 5/02* (2006.01)
*B32B 5/14* (2006.01)

(52) U.S. Cl.
CPC ......... *B60N 2/5657* (2013.01); *B60N 2/5635* (2013.01); *B60N 2/5642* (2013.01); *B32B 5/022* (2013.01); *B32B 5/142* (2013.01)

(58) Field of Classification Search
CPC .. B60N 2/5657; B60N 2/5635; B60N 2/5642; B60N 2/5621; B60N 2/5875
USPC .............. 297/180.1, 180.11, 180.13, 180.14, 297/452.42
See application file for complete search history.

(56) References Cited

U.S. PATENT DOCUMENTS

| 6,857,697 | B2 * | 2/2005 | Brennan | ............... | A47C 7/74 297/180.12 |
| 7,338,117 | B2 * | 3/2008 | Iqbal | ............... | A47C 7/72 297/180.11 |
| 7,637,573 | B2 * | 12/2009 | Bajic | ............... | B60N 2/56 297/452.43 |

(Continued)

FOREIGN PATENT DOCUMENTS

| JP | 2013-233860 A | 11/2013 |
| KR | 20-0237439 Y1 | 10/2001 |

(Continued)

*Primary Examiner* — Mark R Wendell
(74) *Attorney, Agent, or Firm* — Novick, Kim & Lee, PLLC; Jae Youn Kim; Jihun Kim (57) ABSTRACT

Provided is a channel cover for a ventilation seat, the channel cover including a ventilation passage blocking layer which has the shape of a plate that extends in the planar direction and of which a lower surface is positioned on an upper portion of a seat frame; an adhesion layer which extends in the planar direction, of which both upper and lower surfaces have an adhesive property, of which the lower surface is adhered to an upper surface of the ventilation passage blocking layer, and in the upper surface of which a cutting line for separating a release paper sheet is formed; and a non-woven fabric layer which covers an air flow path groove, a lower surface of which is adhered to an upper surface of the adhesion layer, a lateral end portion of which extends more outward than the cutting line, and which covers the cutting line from above.

12 Claims, 9 Drawing Sheets

(56) References Cited

U.S. PATENT DOCUMENTS

| | | | |
|---|---|---|---|
| 2002/0096915 A1* | 7/2002 | Haupt | B60H 1/00285 |
| | | | 297/180.13 |
| 2004/0070236 A1* | 4/2004 | Brennan | B60N 2/5635 |
| | | | 297/180.13 |
| 2005/0067862 A1* | 3/2005 | Iqbal | A47C 7/74 |
| | | | 297/180.11 |
| 2006/0175877 A1* | 8/2006 | Alionte | B60N 2/5635 |
| | | | 297/180.14 |
| 2007/0176471 A1* | 8/2007 | Knoll | B60N 2/5685 |
| | | | 297/180.14 |
| 2015/0165946 A1* | 6/2015 | Taguchi | B60N 2/64 |
| | | | 297/452.42 |
| 2015/0329027 A1* | 11/2015 | Axakov | B60N 2/565 |
| | | | 297/180.13 |
| 2016/0107551 A1* | 4/2016 | Nii | B60N 2/002 |
| | | | 297/180.13 |
| 2018/0126880 A1* | 5/2018 | Kim | B60N 2/5621 |
| 2018/0272953 A1* | 9/2018 | Jeon | B32B 5/022 |

FOREIGN PATENT DOCUMENTS

| | | |
|---|---|---|
| KR | 10-2016-0050131 A | 5/2016 |
| KR | 10-1666422 B1 | 10/2016 |

\* cited by examiner

CHANNEL COVER FOR VENTILATION SEAT AND METHOD OF MANUFACTURING SAME

CROSS REFERENCE TO RELATED APPLICATION

The present application claims priority to Korean Patent Application No. 10-2019-0038268, filed Apr. 2, 2019, the entire contents of which is incorporated herein for all purposes by this reference.

BACKGROUND OF THE INVENTION

Field of the Invention

The present invention relates to a channel cover for a ventilation seat that is provided on a rear side of a seat pad of a ventilation seat for a vehicle to form an air flow path and to a method of manufacturing the channel cover for a ventilation seat.

Description of the Related Art

A vehicle seat is desirably designed to minimize a vehicle occupant's fatigue while driving for a long time.

In recent years, various convenience devices have been installed in a vehicle seat to give an occupant a more comfortable driving experience. One such representative example is a heat-line seat that has a heating function. In addition, in recent years, ventilation seats in which air is forced to circulate for comfort have been under active development. Generally, a ventilation seat is configured to include a blower that blows air into a seat and a seat pad in which many holes are formed to discharge the air flowing from the blower out of the seat.

Flow paths with which many holes communicate in such a manner that the air introduced into the seat pad is evenly distributed are formed in the seat pad of the ventilation seat. The flow path is connected to the blower and plays a role in distributing the air.

In order for external air introduced from the blower to flow into the flow path in the seat pad, a corrugated pipe that results from welding multiple films is positioned underneath the seat pad. The corrugated pipe is connected to the blower through a connector. A channel cover that covers the flow path in the seat pad is positioned underneath the seat pad in such a manner that the external air introduced from the blower is not discharged out of the seat.

That is, the channel cover is positioned between the seat pad and a cushion frame and thus seals the flow path in the seat pad. However, there are indentations on curved surfaces of the seat pad and the cushion frame. It is difficult to make contact with these indentations.

In addition, the channel cover is manufactured of a polypropylene (PP) plastic material. Thus, when a vehicle occupant sits on the ventilation seat, a feeling of irritation is created. In a case where the channel cover is bent or folded between the seat pad and the cushion frame, a noise occurs and the tightness thereof is reduced.

The foregoing is intended merely to aid in understanding the background of the present invention and therefore should not be interpreted to admit that the present invention falls within the purview of the related art that is already known to those skilled in the art.

SUMMARY OF THE INVENTION

An objective of the present invention is to provide a channel cover that includes a non-woven fabric layer to prevent occurrence of a noise by not using a polypropylene (PP) plastic material and to prevent introduced external air from leaking.

According to an aspect of the present invention, there is provided a channel cover for a ventilation seat, the channel cover including: a ventilation passage blocking layer which has the shape of a plate that extends in the planar direction and of which a lower surface is positioned on an upper portion of a seat frame; an adhesion layer which extends in the planar direction, of which both upper and lower surfaces have an adhesive property, of which the lower surface is adhered to an upper surface of the ventilation passage blocking layer for combining, and in the upper surface of which a cutting line for separating a release paper sheet is formed; and a non-woven fabric layer which covers an air flow path groove when extending along the air flow path groove formed in a rear surface of a seat pad and being combined with the rear surface of the seat pad, a lower surface of which is adhered to an upper surface of the adhesion layer, a lateral end portion of which extends more outward than the cutting line in the adhesion layer, and which thus covers the cutting line from above.

In the channel cover, the ventilation passage blocking layer may be formed of a mixture of polyethylene terephthalate (PET) and felt.

In the channel cover, the ventilation passage blocking layer is woven, and the felt has a 20 to 50 weight percent based on the weight of the PET.

In the channel cover the non-woven fabric layer may include: a first non-woven fabric layer that is shaped to surround a through-hole which is formed in the center portion thereof in such a manner that external air supplied from a blower is introduced into the air flow path groove; and a second non-woven fabric layer that extends along the air flow path groove from each of the both sides of the first non-woven fabric layer.

In the channel cover, a first cutting line for removing a first release paper sheet corresponding to a shape of the first non-woven fabric layer may be formed in the adhesion layer in order to adhere the first non-woven fabric layer to an upper surface of the adhesion layer, and the first non-woven fabric layer may be adhered to the upper surface of the adhesion layer from which the first release paper sheet is removed and may cover the first cutting line from above.

In the channel cover, a second cutting line for removing a second release paper sheet corresponding to a shape of a second non-woven fabric layer may be formed in the adhesion layer in order to adhere the second non-woven fabric layer to the upper surface of the adhesion layer, and the second non-woven fabric layer may be adhered to the upper surface of the adhesion layer from which a second release paper sheet is removed and may cover the second cutting line from above.

In the channel cover, a first cutting line for removing a first release paper sheet that is shaped to surround a through-hole which is formed in the center portion thereof in such a manner that external air supplied from a blower is introduced into the air flow path groove may be formed in the adhesion layer, a second line for removing a second release paper sheet that is shaped to extend along the air flow path groove from each of the both sides of the first cutting line may be formed in the adhesion layer, the non-woven fabric layer may include a second non-woven fabric layer that is shaped to correspond to the second release paper sheet, and the second non-woven fabric layer may be adhered to an upper surface of the adhesion layer from which the second release paper sheet is removed, in such a manner as to cover the first cutting line and the second cutting line from above.

In the channel cover, the non-woven fabric layer may include a first non-woven fabric layer that is shaped to correspond to the first release paper sheet, and the first non-woven fabric layer may be adhered to the upper surface of the adhesion layer from which the first release paper sheet is removed, in such a manner as to cover one portion of the second non-woven fabric layer from above.

In the channel cover, the non-woven fabric layer may extend more outward than the air flow path groove in such a manner to cover the air flow path groove when combined with the seat pad.

According to another aspect of the present invention, there is provided a method of manufacturing a channel cover for a ventilation seat, the method including: adhering an adhesion layer to an upper surface of a ventilation passage blocking layer; forming a cutting line for separating a release paper sheet from the upper surface of the adhesion layer; and removing the release paper sheet corresponding to a non-woven fabric layer defined by the formed cutting line and attaching the non-woven fabric layer to the upper surface of the adhesion layer.

The method may further include: removing a third release paper sheet attached to the upper surface of the adhesion layer other than the non-woven fabric layer and combining the upper surface of the adhesion layer to a rear surface of the seat pad, which is performed subsequently to the attaching of the non-woven fabric layer.

In the method, the forming of the cutting line includes forming a first cutting line corresponding to a first non-woven fabric layer that is shaped to surround a through-hole which is formed in the center portion thereof in such a manner that external air supplied from a blower is introduced into the air flow path groove, and further includes forming a second cutting line corresponding to a second non-woven fabric layer that extends along the air flow path groove from each of the both sides of the first non-woven fabric layer.

In the method, the attaching of the non-woven fabric layer to the upper surface of the adhesion layer may include removing a second release paper sheet defined by the second cutting line and attaching the second non-woven fabric layer; and removing a first release paper sheet defined by the first cutting line and attaching the first non-woven fabric layer.

In the method, in the attaching of the first non-woven fabric layer, the first non-woven fabric layer may be adhered to the upper surface of the adhesion layer in such a manner as to cover one portion of the second non-woven fabric layer from above.

The channel cover according to the present invention makes it possible not to use a PP plastic material unnecessary. The air flow path groove in the seat pad is sealed with the channel cover that includes the ventilation passage blocking layer, the adhesion layer, and the non-woven fabric layer. This provides the advantage that transformation due to indentations on the seat pad is prevented in a natural manner.

In addition, the cutting line in the adhesion layer is covered with the non-woven fabric layer. This provides the advantage that external air is prevented from leaking.

DETAILED DESCRIPTION OF THE INVENTION

Embodiments of the present invention, which are disclosed in the present specification or application, will be described in terms of specific structure and functions in order to provide an easy understanding thereof. However, the embodiments of the present invention may be implemented in various ways, and the present invention should not be construed as being limited to the embodiments that are described in the present specification or application.

Various modifications to the embodiments of the present invention may be made. According to aspects of the present invention, there may also be provided various embodiments. Specific embodiments will be described in detail below with reference to the accompanying drawings. However, this description does not limit the embodiments according to the present invention to the disclosed specific embodiments, and all alterations, equivalents, and substitutes that are included within the technical idea of the present invention should be understood as falling within the scope of the present invention.

The terms first, second, and so on may be used to describe various constituent elements, but should not impose any limitation on the meanings of the constituent elements. The terms described above are used only for the purpose of distinguishing one constituent element from another. For example, without departing from the scope of each claim that defines the present invention, a first constituent element may be named as a second constituent element, and likewise, a second constituent element may be named a first second element.

It should be understood that, when a constituent element is referred to as being "connected to" or "coupled to" a different constituent element, the constituent element may be connected to or coupled to the different constituent element, or an intervening constituent element may also be present therebetween. In contrast, it should be understood that, when a constituent element is referred to as being "directly connected to" or "directly coupled to" another element, no intervening element is present therebetween. Likewise, other phrases describing a relationship among constituent elements, that is, "between" and "right between", or "adjacent to" and "directly adjacent to" should be construed.

Terms in the present specification are used only for describing specific embodiments and are not intended to impose any limitation to the present invention. An expression in the singular has the same meaning as an expression in the plural, except as specifically expressed in context. It should be understood that the terms "include", "have", and the like, which are used in the present specification, are intended to indicate that a feature, a number, a step, an operation, a constituent element, a component, or a combination of these, which is described, is present, and that the term does not negate in advance the likelihood that one or more other features, numbers, steps, operations, constituent elements, or combinations of these will be present and be added.

Unless otherwise defined, all terms including technical or scientific terminals, which are used in the present specification, have the same meanings as are normally understood by a person of ordinary skill in the art to which the present invention pertains. The term as defined in dictionaries that are in general use should be construed as having the same meaning in context in the relevant art, and, unless otherwise explicitly defined in the present specification, should not be construed as having an original meaning or a purely literal meaning.

Preferable embodiments of the present invention will be described in detail below with reference to the accompanying drawings. The same reference numeral in the drawings depicts the same constituent element.

Figure 1:
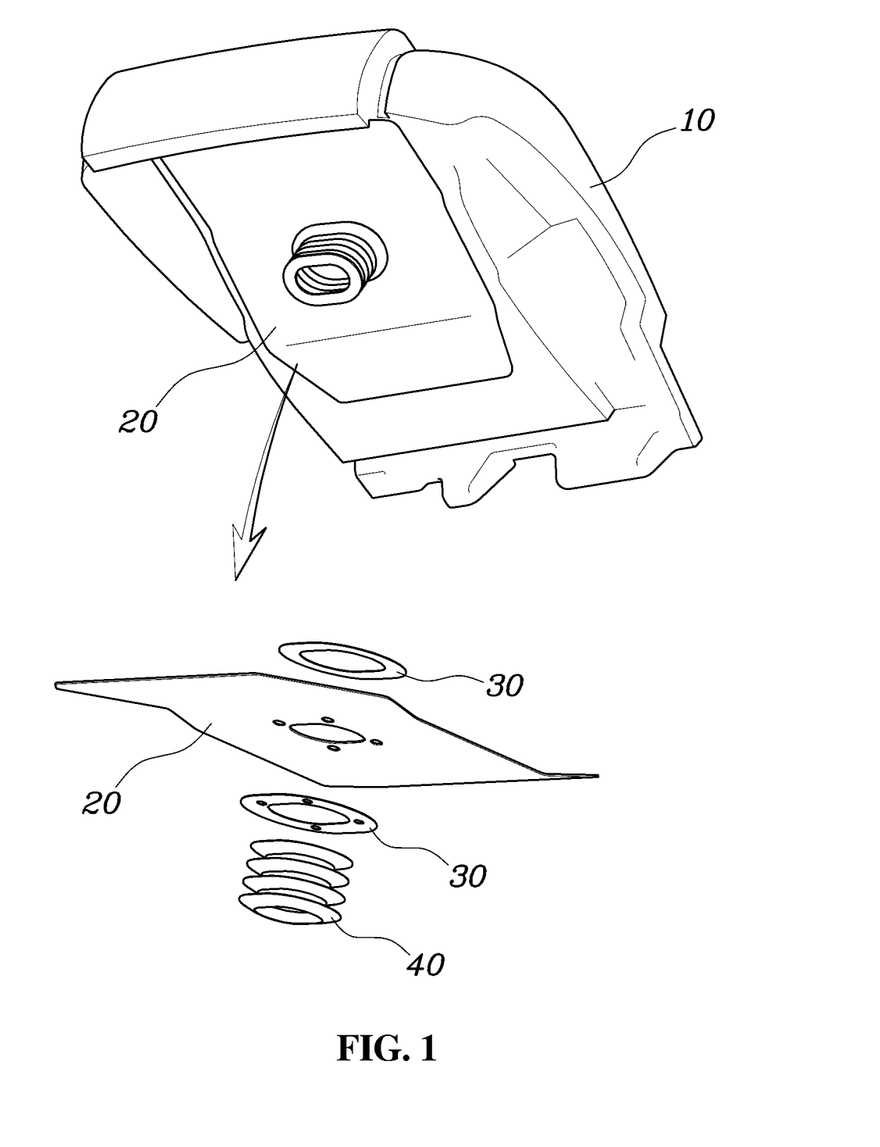
FIG. 1 is a diagram illustrating a cushion of a ventilation seat according to an embodiment of the present invention.
Figure 2:
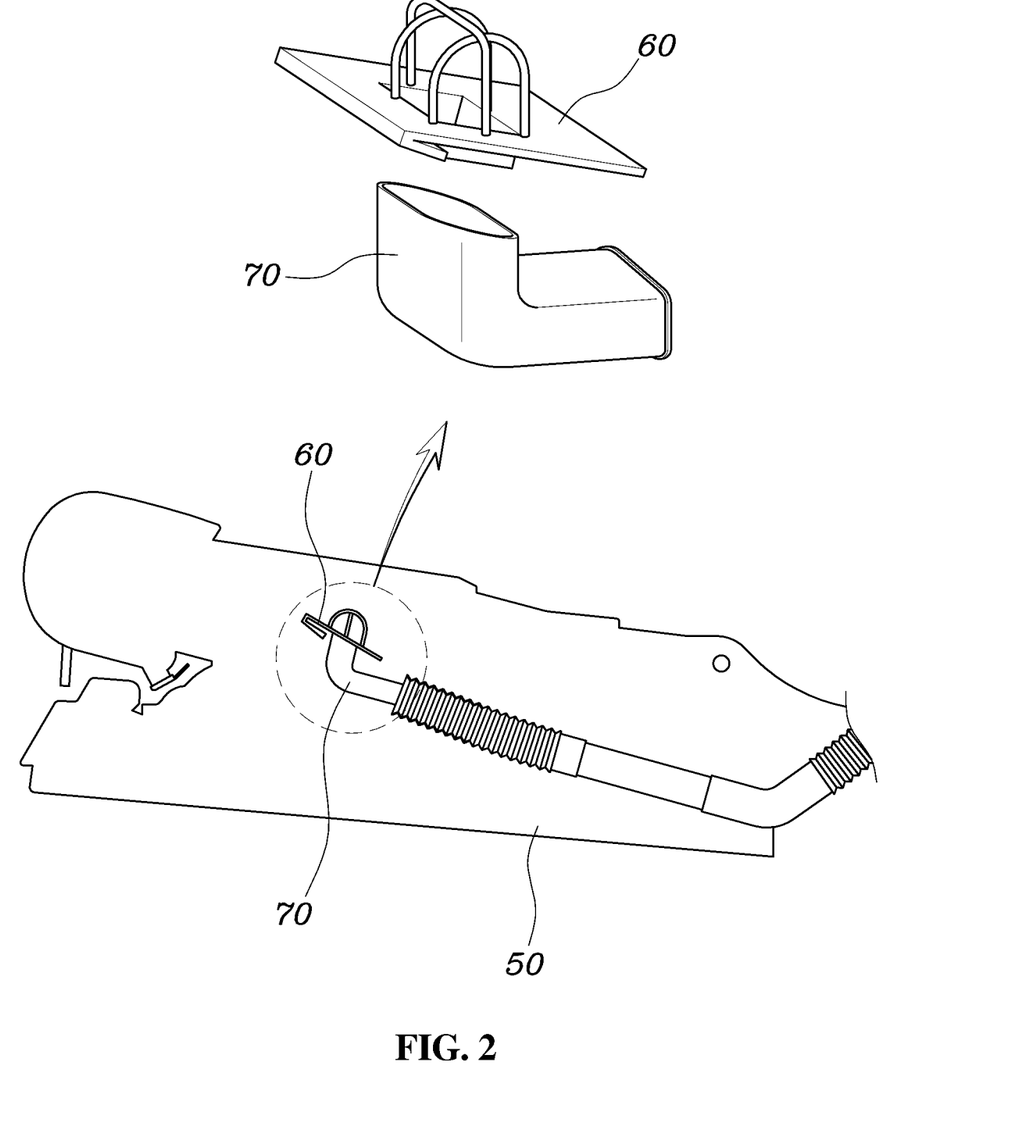
FIG. 2 is a diagram illustrating a frame of the ventilation seat according to the embodiment of the present invention.

FIG. 1 illustrates a cushion of a ventilation seat according to an embodiment of the present invention. FIG. 2 illustrates a frame of the ventilation seat according to the embodiment of the present invention.

With reference to FIGS. 1 and 2, a cushion 10 of the ventilation seat is positioned on an upper position of a frame 50. External air is supplied to the cushion 10 through a duct 70 connected to a blower (not illustrated) within the frame 50. Particularly, the duct 70 is connected to a channel cover 20 that is attached to a rear side of the cushion 10 through a connector 60 and a corrugated pipe 40, the channel cover 20 seals a flow path (not illustrated) formed in the cushion 10, and thus the external air supplied through the duct 70 is supplied to the cushion 10.

One end of the corrugated pipe 40 for the ventilation seat according to the present invention is combined with the channel cover 20. The other end thereof is combined with the connector 60. Thus, the corrugated pipe 40 is positioned between the cushion 10 of the ventilation seat and the frame 50. The corrugated pipe 40 is combined with the channel cover 20 with an adhesion film 30 or the like.

The corrugated pipe 40 possibly increases or decreases in length in the longitudinal direction. Although transformation takes place when a vehicle occupant sits on the ventilation seat, the airtightness is maintained, and thus the external air supplied from the blower (not illustrated) can be prevented from leaking. Particularly, a film formed of a thin thermoplastic polyurethane (TPU) material according to the present invention is thin and is easy to process. This provides the advantage that packaging of the ventilation seat is easily facilitated in an ensured manner.

Figure 3:
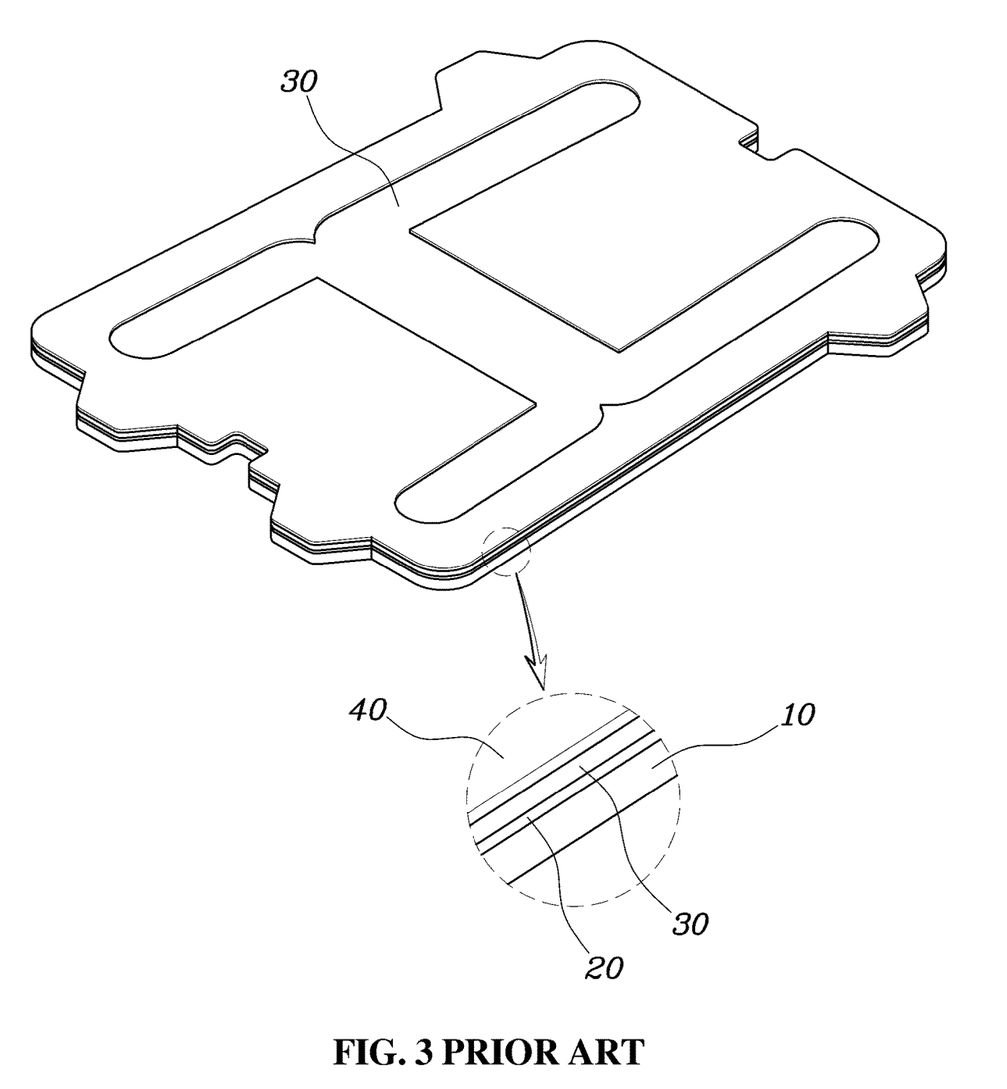
FIG. 3 is a diagram illustrating a channel cover in the related art.

FIG. 3 illustrates a channel cover in the related art.

With reference to FIG. 3, the channel cover in the related art is formed to include a felt 10, a lower adhesion layer 20, a plastic layer 30, and an upper adhesion layer. Particularly, the upper adhesion layer 40 is removed along an air flow path groove formed in a rear side of a seat pad and is shaped in such a manner that the plastic layer 30 is exposed along the air flow path groove.

However, the plastic layer 30 is formed of a PP material. In this respect, in the channel cover in the related art, a height difference occurs between curved surfaces of the seat pad and the frame. Thus, a portion of the channel cover rises up. Accordingly, when the vehicle occupant sits on the ventilation seat, the rising-up portion is bent. Thus, a feeling of irritation is created, and a noise occurs.

In addition, the cost of a PP material accounts for a relatively large share of a manufacturing cost, thereby increasing a unit price of the product. When the vehicle occupant sits on the ventilation seat, a difference in the amount of transformation due to physical properties of layers included in the channel cover causes the separation from the seat pad. Thus, the airtightness is not ensured.

Figure 4:
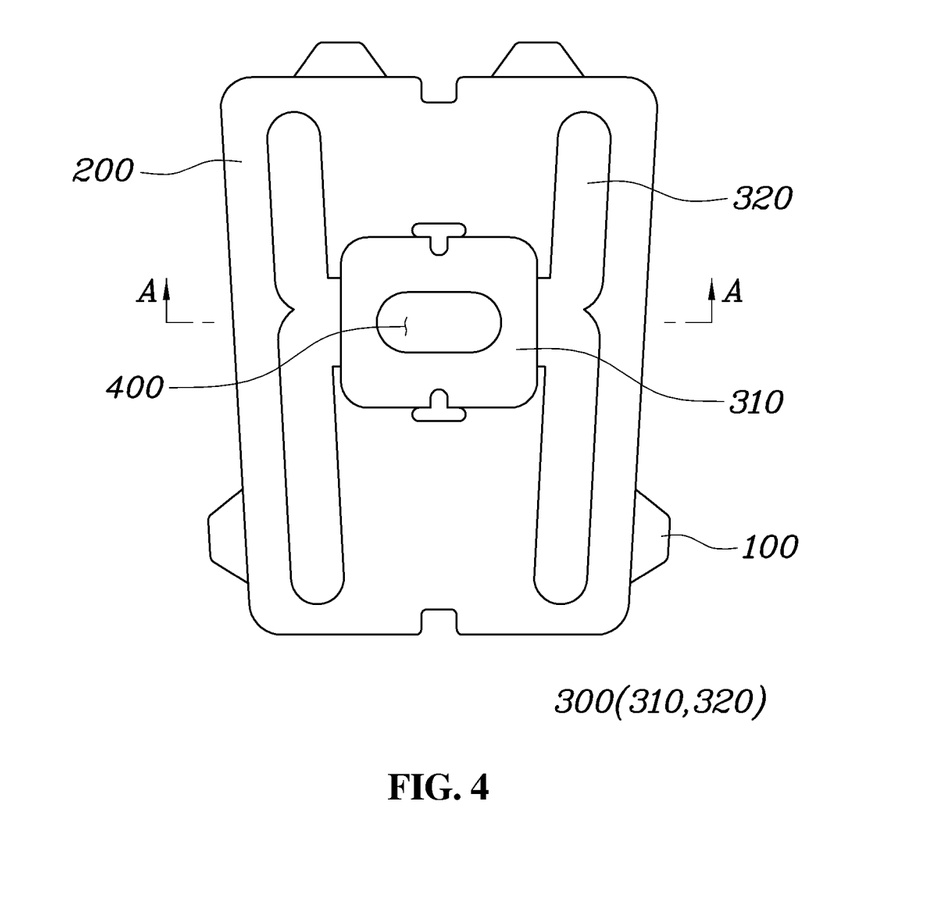
FIGS. 4 and 5 are diagrams each illustrating a channel cover according to an embodiment of the present invention.
Figure 5:
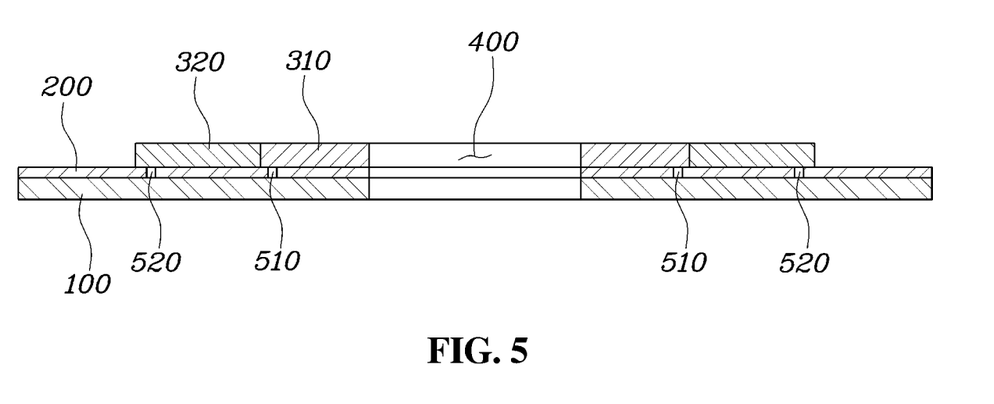

FIGS. 4 and 5 are diagrams each illustrating a channel cover according to an embodiment of the present invention.

With reference to FIGS. 4 and 5, the channel cover according to the embodiment of the present invention includes a ventilation passage blocking layer 100 which has the shape of a plate that extends in the planar direction and of which a lower surface is positioned on an upper portion of a seat frame; an adhesion layer 200 which extends in the planar direction, of which both upper and lower surfaces have an adhesive property, of which the lower surface is adhered to an upper surface of the ventilation passage blocking layer 100 for combining, and in the upper surface of which a cutting line for separating a release paper sheet is formed; and a non-woven fabric layer 300 which covers an air flow path groove when extending along the air flow path groove formed in a rear surface of a seat pad and being combined with the rear surface of the seat pad, a lower surface of which is adhered to an upper surface of the adhesion layer 200, a lateral end portion of which extends more outward than the cutting line in the adhesion layer 200, and which thus covers the cutting line from above.

Accordingly, a PP plastic material is not used, and the air flow path groove in the seat pad is sealed with the channel cover including the ventilation passage blocking layer 100, the adhesion layer 200, and the non-woven fabric layer 300. This provides the advantage that the transformation due to indentations on the seat pad is prevented in a natural manner. In addition, the cutting line in adhesion layer 200 is covered with the non-woven fabric layer 300. This provides the advantage that the external air is prevented from leaking.

The adhesion layer 200 may be formed of the same material than a tape of which both sides that have an adhesive property. A lower surface of the adhesion layer 200 is combined with the ventilation passage blocking layer 100, and the release paper sheet is attached to the upper surface of the adhesion layer 200. The release paper sheet can be removed later to attach the non-woven fabric layer 300.

The ventilation passage blocking layer 100 is positioned on the upper portion of the seat frame and may come into direct contact with the seat frame. The ventilation passage blocking layer 100 itself can block an air flow in an airtight manner.

Particularly, the ventilation passage blocking layer 100 may be formed of a mixture of polyethylene terephthalate (PET) and felt. The ventilation passage blocking layer 100 is positioned at a position where it can come into direct contact with the seat frame. Thus, the durability is required of the ventilation passage blocking layer 100. When formed of a mixture of PET and felt, the ventilation passage blocking layer 100 has an airtightness property of blocking an air flow. This provides the advantage that the durability is improved.

More specifically, the ventilation passage blocking layer 100 is formed of material into which a mixture having a 20 to 50 weight percent of the felt based on the weight of the PET fabric is woven. That is, the ventilation passage blocking layer 100 may be a mixed woven fabric into which a mixture that results from mixing PET fabric into felt is woven.

Specifically, the non-woven fabric layer 300 may include a first non-woven fabric layer 310 that is shaped to surround a through-hole 400 which is formed in the center portion thereof in such a manner that the external air supplied from the blower is introduced into the air flow path groove; and a second non-woven fabric layer 320 that extends along the air flow path groove from each of the both sides of the first non-woven fabric layer 310.

The first non-woven fabric layer 310 may be shaped in such a manner that the through-hole 400 that communicates with an air flow path formed in the ventilation passage blocking layer 100 and the adhesion layer 200 is formed in the center portion thereof. Furthermore, the first non-woven fabric layer 310 may be shaped to cover the through-hole 400. The external air is introduced into the through-hole 400. The air flow path may communicate with the air flow path groove in the seat pad that is covered with the channel.

On the center portions of the ventilation passage blocking layer 100 and the adhesion layer 200, the second non-woven fabric layers 320 may extend, along the air flow path groove formed in the seat pat, from each of the both sides of the first non-woven fabric layer 310. This provides the advantage that the airtightness is improved in such a manner that the air flow path groove is sealed with the second non-woven fabric layer 320 and that the adhesion layer 200 is prevented from being attached to the inside of the air flow path groove.

The first non-woven fabric layer 310 and the second non-woven fabric layer 320 may be formed of the same material, but may be formed of different materials. The first non-woven fabric layer 310 may be combined with or integrally formed with a separate component that is connected to the duct.

According to an embodiment, a first cutting line 510 for removing a first release paper sheet 210 corresponding to a shape of the first non-woven fabric layer 310 may be formed in the adhesion layer 200 in order to adhere the first non-woven fabric layer 310 to an upper surface of the adhesion layer 200, and the first non-woven fabric layer 310 may be adhered to the upper surface of the adhesion layer 200 from which the first release paper sheet 210 is removed and may cover the first cutting line 510 from above.

The first cutting line 510 may be a cutting line for separating the first release paper sheet 210 corresponding to the shape of the first non-woven fabric layer 310. With half-cutting, the first release paper sheet 210 that is among release paper sheets attached to an upper portion of the adhesion layer 200 may be separated.

The first non-woven fabric layer 310 may be adhered to the adhesion layer 200 from which the first release paper sheet 210 is removed and may cover the first cutting line 510. Accordingly, this provides the advantage that air can be prevented from leaking through the first cutting line 510.

A second cutting line 520 for removing a second release paper sheet 220 corresponding to a shape of the second non-woven fabric layer 320 may be formed in the adhesion layer 200 in order to adhere the second non-woven fabric layer 320 to the upper surface of the adhesion layer 200, and the second non-woven fabric layer 320 may be adhered to the upper surface of the adhesion layer 200 from which the second release paper sheet 220 is removed and may cover the second cutting line 520 from above.

The second cutting line 520 may be formed in order to remove the second release paper sheet 220 corresponding to the second non-woven fabric layer 320 that extend through the air flow path groove from each of the both sides of the first cutting line 510

The second non-woven fabric layer 320 may be attached to the upper portion of the adhesion layer 200 in a state where the second release paper sheet 220 defined by the second cutting line 520 is removed. Accordingly, this provides the advantage that the air that flows through the air flow path groove can be prevented from being discharged into a space other than the seat pad.

The first non-woven fabric layer 310 and the second non-woven fabric layer 320 may extend to be larger than the air flow path groove form in the seat pad. Accordingly, although the seat pad is transformed, the entire air flow path groove is covered. This provides the advantage that the airtightness is maintained.

For example, the first cutting line 510 and the second cutting line 520 may be formed to be the same as the air flow path groove. The first non-woven fabric layer 310 and the second non-woven fabric layer 320 may be formed to be larger than the first cutting line 510 and the second cutting line 520, respectively, for covering them. Thus, the entire air flow path groove can be covered.

According to another embodiment, the first cutting line 510 and the second cutting line 520 may be formed in the adhesion layer 200. The first cutting line 510 is for removing the first release paper sheet 210 that is shaped to cover the through-hole 400 positioned in the center portions of the ventilation passage blocking layer 100 and the adhesion layer 200. The second cutting line 520 is for removing the second release paper sheet 220 that is shaped to extend along the air flow path groove from each of the both sides of the first cutting line 510. The non-woven fabric layer 300 may include the second non-woven fabric layer 320 that is shaped to correspond to the second release paper sheet 220. The second non-woven fabric layer 320 may be adhered to the upper surface of the adhesion layer 200 from which the second release paper sheet 220 is removed, in such a manner as to cover the first cutting line 510 and the second cutting line 520 from above.

That is, the non-woven fabric layer 300 may include the second non-woven fabric layer 320. The second non-woven fabric layer 320 may be adhered to the upper surface of the adhesion layer 200 in a state where only a shape thereof corresponding to the second release paper sheet 220 is removed between the first cutting line 510 and the second cutting line 520.

Instead of the first non-woven fabric layer 310, a separate component may be combined with the first release paper sheet 210 defined by the first cutting line 510. For example, a corrugated pipe that connects between the channel cover and the connector of the seat frame may further be included, and a separate component that is combined with an upper portion of the corrugated pipe may be combined with a position of the first release paper sheet 210.

In this case, the second non-woven fabric layer 320 may be formed to be larger than the second release paper sheet 220 in such a manner as to cover both the first cutting line 510 and the second cutting line 520 from above.

According to an embodiment, in a state of being combined laterally with the second non-woven fabric layer 320 in a manner that is brought into contact therewith, the first non-woven fabric layer 310 may be adhered to the upper surface of the adhesion layer 200 at the same time as the second non-woven fabric layer 320. Alternatively, in a state where the second non-woven fabric layer 320 is attached, a flank surface of the first non-woven fabric layer 310 may be adhered to a flank surface of the second non-woven fabric layer 320 in a manner that is brought into contact therewith.

According to another embodiment, the non-woven fabric layer 300 may include the first non-woven fabric layer 310 that is shaped to correspond to the first release paper sheet 210, and the first non-woven fabric layer 310 may be adhered to the upper surface of the adhesion layer 200 from which the first release paper sheet 210 is removed in such a manner as to cover one portion of the second non-woven fabric layer 320 from above.

That is, the first non-woven fabric layer 310 may be formed in such a manner as to cover one portion of the second non-woven fabric layer 320 from above. Particularly, the first cutting line 510 may be covered. Accordingly, the external air may not be discharged through a gap that occurs between the first non-woven fabric layer 310 and the second non-woven fabric layer 320. In addition, an upper portion of the second non-woven fabric layer 320 can be prevented from rising up when considering a flow direction of air that flows in a direction of extension from the through-hole 400 through which the external air is introduced to the air flow path groove.

The non-woven fabric layer 300 may extend more outward than the air flow path groove in such a manner as to cover the air flow path groove when combined with the seat pad. Particularly, the second non-woven fabric layer 320 may extend more outward than the air flow path groove. Thus, although the seat pad is transformed, the air flow path groove can be covered. The first non-woven fabric layer 310 may also be formed to extend more outward than the air flow path groove formed in the seat pad while covering the through-hole 400.

Figure 6:
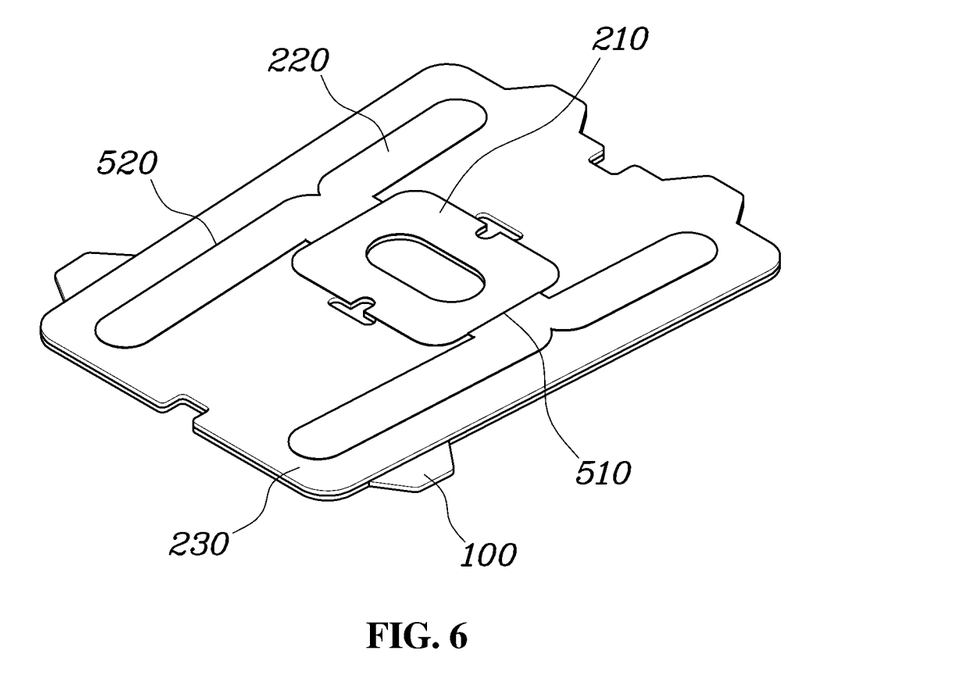
FIG. 6 is a diagram illustrating a state where a ventilation passage blocking layer and an adhesion layer according to an embodiment of the present invention are combined.
Figure 7:
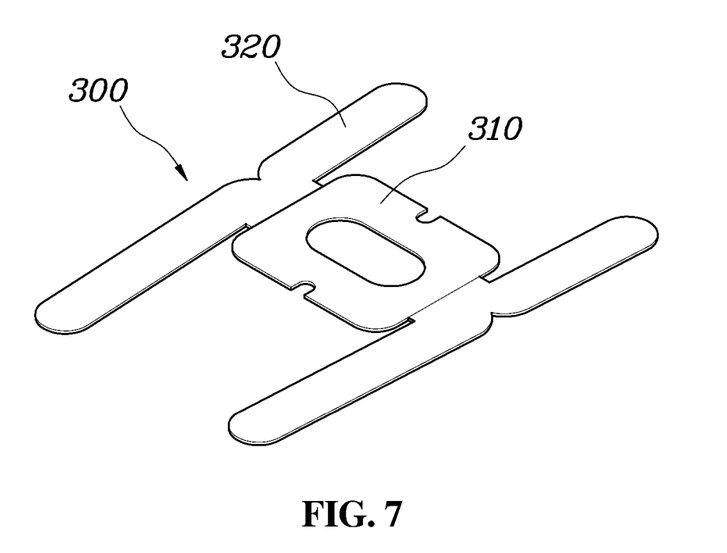
FIG. 7 is a diagram illustrating a non-woven fabric layer according to an embodiment of the present invention.
Figure 8:
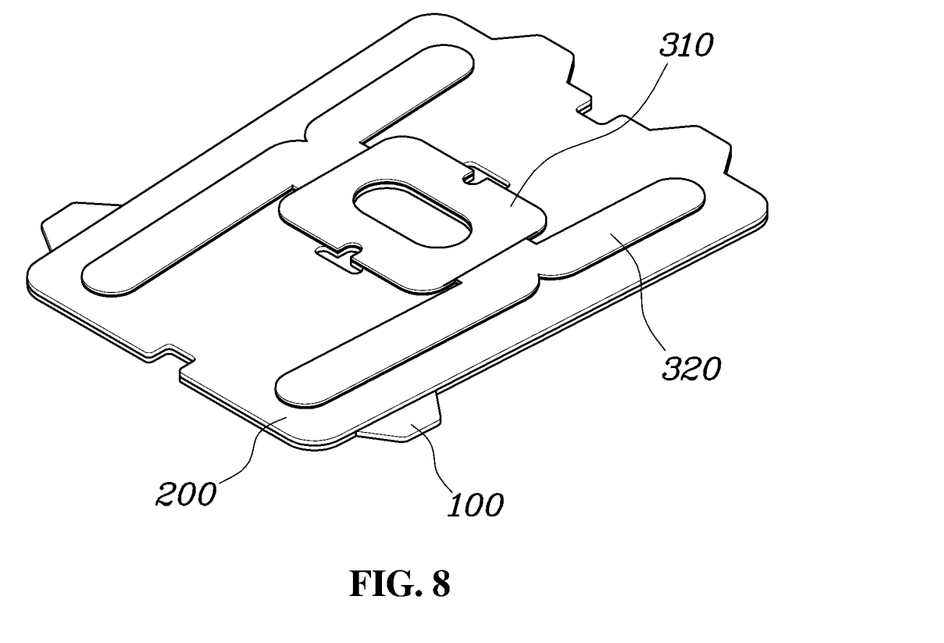
FIG. 8 is a diagram illustrating a state where the non-woven fabric layer is combined with the ventilation passage blocking layer and the adhesion layer according to the embodiment of the present invention are combined.
Figure 9:
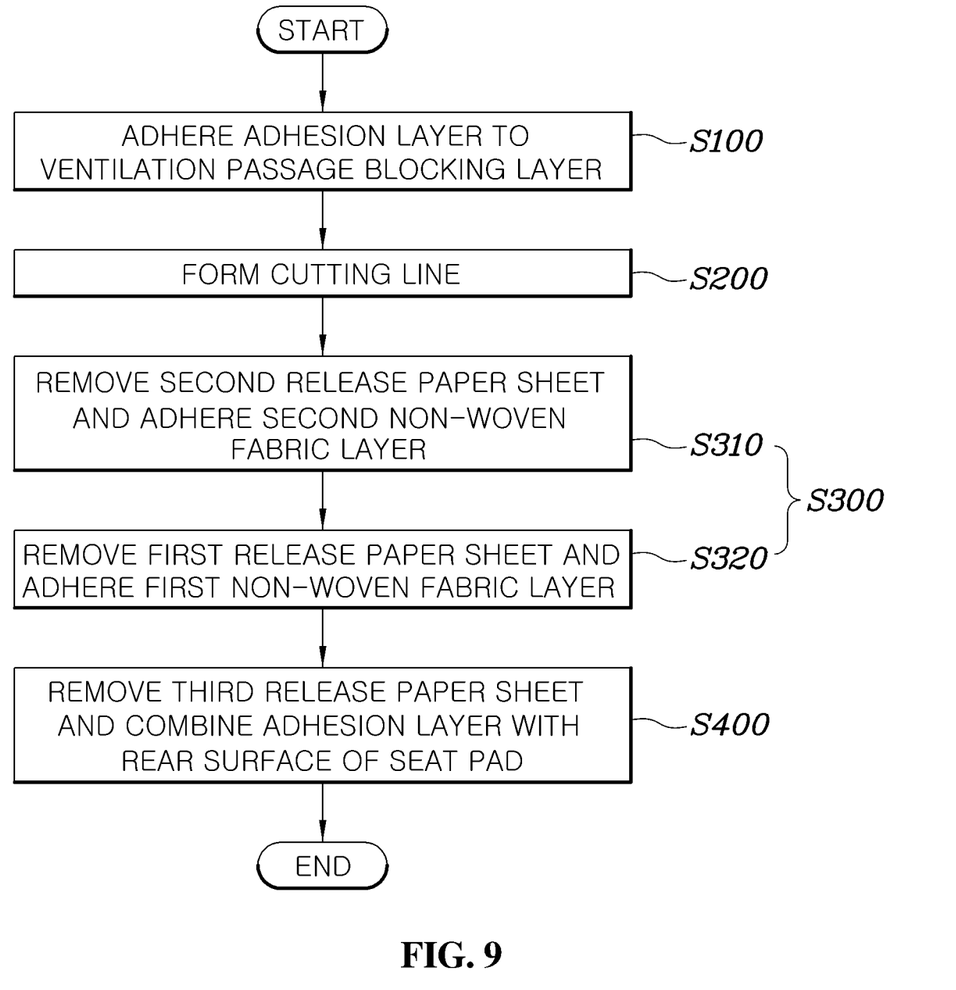
FIG. 9 is a flowchart illustrating a method of manufacturing the channel cover for the ventilation seat according to an embodiment of the present invention.

FIG. 6 illustrates a state where the ventilation passage blocking layer 100 and the adhesion layer 200 according to an embodiment of the present invention are combined. FIG. 7 illustrates the non-woven fabric layer 300 according to an embodiment of the present invention. FIG. 8 illustrates a state where the non-woven fabric layer 300 is combined with the ventilation passage blocking layer 100 and the adhesion layer 200 according to the embodiment of the present invention. FIG. 9 is a flowchart illustrating a method of manufacturing the channel cover for the ventilation seat according to an embodiment of the present invention.

With reference to FIGS. 6 to 9, the method of manufacturing the channel cover for the ventilation seat includes Step S100 of adhering the adhesion layer 200 to the upper surface of the ventilation passage blocking layer 100; Step S200 of forming the cutting line for separating the release paper sheet from the upper surface of the adhesion layer 200; and Step S300 of removing the release paper sheet corresponding to the non-woven fabric layer 300 defined by the formed cutting line and attaching the non-woven fabric layer 300 to the upper surface of the adhesion layer 200.

Particularly, FIG. 6 illustrates a state where only the cutting lines 510 and 520 are formed in a state where the release paper sheets 210, 220, and 230 are not removed from the upper surface of the adhesion layer 200.

Step S400 of removing the third release paper sheet 230 attached to the upper surface of the adhesion layer 200 other than the non-woven fabric layer 300 and combining the upper surface of the adhesion layer 200 to the rear surface of the seat pad, which is performed subsequently to Step S300 of attaching the non-woven fabric layer 300, may further be included.

The third release paper sheet 230 refers to an external area of the second release paper sheet 220 in a state where the first release paper sheet 210 and the second release paper sheet 220 that are among the release paper sheets attached to the upper surface of the adhesion layer 200 are removed. That is, after the non-woven fabric layer 300 is attached, the remaining release paper sheets may be removed, and the upper surface of the adhesion layer 200 may be combined with the rear surface of the seat pad.

In Step S200 of forming the cutting line, the first cutting line 510 corresponding to the first non-woven fabric layer 310 that is shaped to surround the through-hole 400 which is formed in the center portion thereof in such a manner that the external air supplied from the blower is introduced into the air flow path groove, and the second cutting line 520 corresponding to the second non-woven fabric layer 320 that extends along the air flow path groove from each of the both sides of the first non-woven fabric layer 310 may be formed in the adhesive layer 200.

The second release paper sheet 220 may be formed in such a manner as to be removed with the first cutting line 510 and the second cutting line 520. The first release paper sheet 210 and the second release paper sheet 220 may be formed to be the same as the air flow path groove in the seat pad. The first non-woven fabric layer 310 and the second non-woven fabric layer 320 may be formed to be larger than and thus extend more outward than the air flow path groove.

Step S300 of attaching the non-woven fabric layer 300 to the upper surface of the adhesion layer 200 may include Step S310 of removing the second release paper sheet 220 defined by the second cutting line 520 and attaching the second non-woven fabric layer 320, and Step S320 of removing the first release paper sheet 210 defined by the first cutting line 510 and attaching the first non-woven fabric layer 310.

That is, in a state where the second release paper sheet 220 is removed, the second non-woven fabric layer 320 may be attached, and subsequently, in a state where the first release paper sheet 210 is removed, the first non-woven fabric layer 310 may be attached. The second non-woven fabric layer 320 may cover both the first cutting line 510 and the second cutting line 520 from above.

The first non-woven fabric layer 310 may include a separate component that is connected to the duct on the seat frame side.

Particularly, in Step S320 of attaching the first non-woven fabric layer 310, the first non-woven fabric layer 310 may be adhered to the upper surface of the adhesion layer 200 in such a manner as to cover one portion of the second non-woven fabric layer 320 from above.

As illustrated in FIG. 7, the first non-woven fabric layer 310 and the second non-woven fabric layer 320 may be attached to the upper portion of the adhesion layer 200 at the same time in such a manner that flank surfaces thereof are brought into contact with each other.

However, the second non-woven fabric layer 320 may be first attached, and then the first non-woven fabric layer 310 may be attached to the upper portion of the adhesion layer 200 in such a manner as to cover one portion of the second non-woven fabric layer 320. The first non-woven fabric layer 310 may overlap one portion of the second non-woven fabric layer 320 covering the first cutting line 510 and thus may cover the first cutting line 510. Accordingly, this provides the advantage that the airtightness due to the non-woven fabric layer 300 is enhanced.

In addition, the first non-woven fabric layer 310 covers one part of the upper portion of the second non-woven fabric layer 320 when considering that air flows from an upper portion of the first non-woven fabric layer 310 to an upper portion of the second non-woven fabric layer 320. This provides the advantage that the first non-woven fabric layer 310 overlapping due to an air flow can be prevented from rising up.

The specific embodiments of the present invention are illustrated and described, and it is obvious to a person of ordinary skill in the art that various modifications and changes are possibly made to the present invention without departing from the technical idea behind the present invention, which is claimed in the following claims.

What is claimed is:

1. A channel cover for a ventilation seat, the channel cover comprising:
    a ventilation passage blocking layer which extends in a planar direction and includes a lower surface to be positioned on an upper portion of a seat frame;
    an adhesion layer which extends in the planar direction and includes an upper and a lower surfaces having an adhesive property, wherein the lower surface of the adhesion layer is adhered to an upper surface of the ventilation passage blocking layer for combining, and wherein the adhesion layer includes a cutting line disposed on the upper surface thereof for separating a release paper sheet; and
    a non-woven fabric layer for covering an air flow path groove when extending along the air flow path groove formed in a rear surface of a seat pad and being combined with the rear surface of the seat pad, wherein the non-woven fabric layer includes a lower surface adhered to the upper surface of the adhesion layer and a lateral end portion extending more outward than the cutting line of the adhesion layer, thereby covering the cutting line,
    wherein the non-woven fabric layer comprises:
    a first non-woven fabric layer that is shaped to surround a through-hole which is formed at a center portion thereof in such a manner that external air supplied from a blower is introduced into the air flow path groove; and
    a second non-woven fabric layer that extends along the air flow path groove from each of two sides of the first non-woven fabric layer.

2. The channel cover according to claim 1, wherein the ventilation passage blocking layer is formed of a mixture of polyethylene terephthalate (PET) and felt.

3. The channel cover according to claim 2, wherein the ventilation passage blocking layer is woven, and the felt has a 20 to 50 weight percent based on the weight of the PET.

4. The channel cover according to claim 1, wherein the cutting line includes a first cutting line for removing a first release paper sheet corresponding to a shape of the first non-woven fabric layer disposed on the adhesion layer in order to adhere the first non-woven fabric layer to the upper surface of the adhesion layer, and
    the first release paper sheet is removed from the adhesion layer and covers the first cutting line.

5. The channel cover according to claim 4, wherein the cutting line includes a second cutting line for removing a second release paper sheet corresponding to a shape of the second non-woven fabric layer disposed on the adhesion layer in order to adhere the second non-woven fabric layer to the upper surface of the adhesion layer, and
    the second release paper sheet is removed from the adhesion layer and covers the second cutting line.

6. The channel cover according to claim 1, wherein the non-woven fabric layer extends more outward than the air flow path groove in such a manner to cover the air flow path groove when combined with the seat pad.

7. A channel cover for a ventilation seat, the channel cover comprising:
    a ventilation passage blocking layer which extends in a planar direction and includes a lower surface to be positioned on an upper portion of a seat frame;
    an adhesion layer which extends in the planar direction and includes an upper and a lower surfaces having an adhesive property, wherein the lower surface of the adhesion layer is adhered to an upper surface of the ventilation passage blocking layer for combining, and wherein the adhesion layer includes a cutting line disposed on the upper surface thereof for separating a release paper sheet; and
    a non-woven fabric layer for covering an air flow path groove when extending along the air flow path groove formed in a rear surface of a seat pad and being combined with the rear surface of the seat pad, wherein the non-woven fabric layer includes a lower surface adhered to the upper surface of the adhesion layer and a lateral end portion extending more outward than the cutting line of the adhesion layer, thereby covering the cutting line,
    wherein the cutting line comprises a first cutting line for removing a first release paper sheet that is shaped to surround a through-hole which is disposed at a center portion thereof in such a manner that external air supplied from a blower is introduced into the air flow path groove,
    wherein the cutting line further comprises a second cutting line for removing a second release paper sheet that is shaped to extend along the air flow path groove from each of two sides of the first cutting line,
    wherein the non-woven fabric layer includes a second non-woven fabric layer that is shaped to correspond to the second release paper sheet, and
    wherein the second non-woven fabric layer is adhered to the upper surface of the adhesion layer from which the second release paper sheet is removed, in such a manner as to cover the first cutting line and the second cutting line.

8. The channel cover according to claim 7, wherein the non-woven fabric layer includes a first non-woven fabric layer that is shaped to correspond to the first release paper sheet, and
    the first non-woven fabric layer is adhered to the upper surface of the adhesion layer from which the first release paper sheet is removed, in such a manner as to cover one portion of the second non-woven fabric layer.

9. A method of manufacturing a channel cover for a ventilation seat, the method comprises:
    adhering an adhesion layer to an upper surface of a ventilation passage blocking layer;
    forming a cutting line for separating a release paper sheet from the upper surface of the adhesion layer; and
    removing the release paper sheet corresponding to a non-woven fabric layer defined by the formed cutting line and attaching the non-woven fabric layer to the upper surface of the adhesion layer,
    wherein the forming of the cutting line comprises forming a first cutting line corresponding to a first non-woven fabric layer that is shaped to surround a through-hole which is formed at a center portion thereof in such a manner that external air supplied from a blower is introduced into the air flow path groove, and forming a second cutting line corresponding to a second non-woven fabric layer that extends along the air flow path groove from each of two sides of the first non-woven fabric layer.

10. The method according to claim 9, further comprising: removing a third release paper sheet attached to the upper surface of the adhesion layer other than the non-woven fabric layer and combining the upper surface of the adhesion layer to a rear surface of the seat pad, which is performed subsequently to the attaching of the non-woven fabric layer.

11. The method according to claim 9, wherein the attaching of the non-woven fabric layer to the upper surface of the adhesion layer includes:
   removing a first release paper sheet defined by the first cutting line and attaching the first non-woven fabric layer; and
   removing a second release paper sheet defined by the second cutting line and attaching the second non-woven fabric layer.

12. The method according to claim 11, wherein in the attaching of the first non-woven fabric layer, the first non-woven fabric layer is adhered to the upper surface of the adhesion layer in such a manner as to cover one portion of the second non-woven fabric layer.

* * * * *